Feb. 27, 1945.  D. B. LUTEN, JR., ET AL  2,370,554
PROCESS FOR THE PRODUCTION OF 2,3,5-TRIMETHYL PHENOL
Filed Sept. 23, 1941
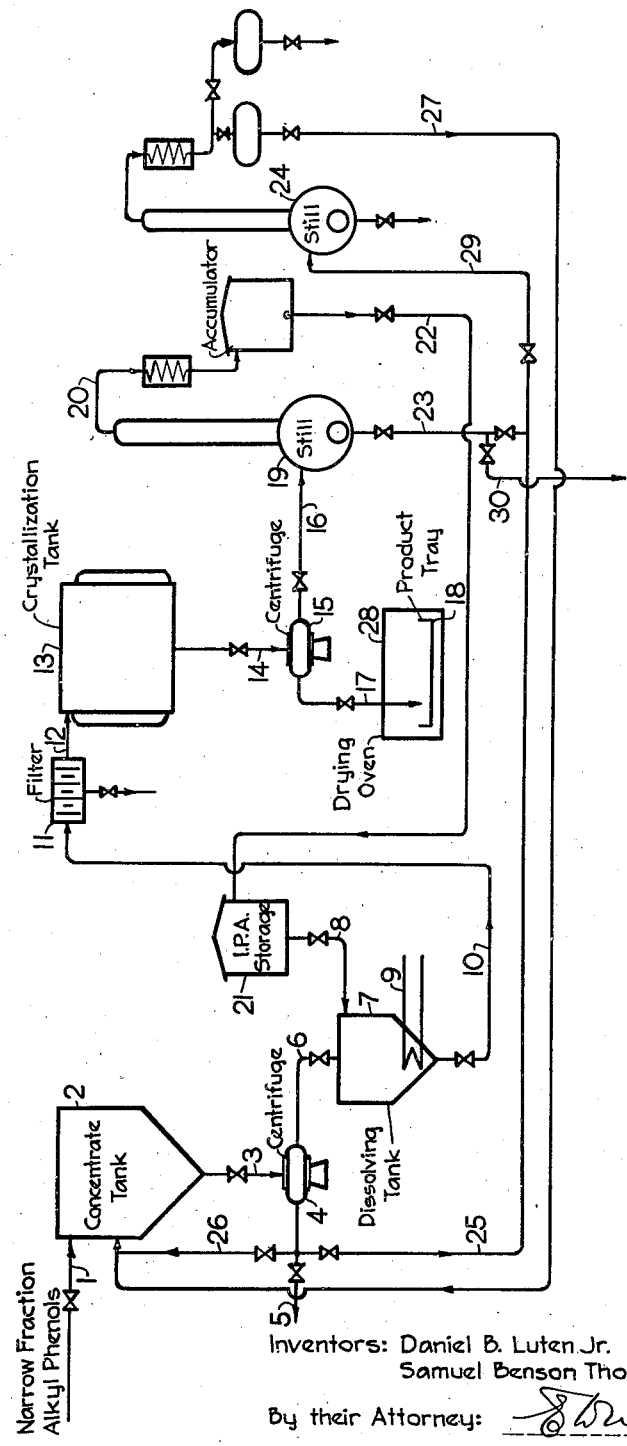
Inventors: Daniel B. Luten Jr.
Samuel Benson Thomas
By their Attorney:

Patented Feb. 27, 1945

2,370,554

UNITED STATES PATENT OFFICE 2,370,554

PROCESS FOR THE PRODUCTION OF 2,3,5-TRIMETHYL PHENOL

Daniel B. Luten, Jr., and Samuel Benson Thomas, Berkeley, Calif., assignors to Shell Development Company, San Francisco, Calif., a corporation of Delaware Application September 23, 1941, Serial No. 411,994

2 Claims. (Cl. 260—621)

This invention relates to a new method for separating certain alkyl phenols from crude alkyl phenol mixtures such as are obtained by extraction of coal tar or cracked petroleum distillates with strong caustic alkali, e. g., 25%–50% aqueous solutions of alkali metal hydroxide. More particularly, it is concerned with a process for the separation of crystalline 2,3,5-trimethyl phenol from such mixtures.

The general composition of alkyl phenol mixtures extracted from cracked petroleum and coal tar distillates has been under investigation for some time. It has been suggested that among the great variety of individual phenolic compounds the following may be present in the mixtures: phenol, o-cresol, p-cresol, m-cresol, o-ethylphenol, 1,2,3-xylenol, 1,3,4-xylenol, 1,4,2-xylenol, p-ethylphenol, 1,3,5-xylenol, mesitol, 1,2,4-xylenol, p-isopropylphenol, cumenol, p-propylphenol, isopseudocumenol (2,3,5-trimethyl phenol), pseudocumenol, catechol, durenol, pentamethylphenol, etc.

It is known that certain of the alkylated and particularly the methylated phenols are very valuable in the production of intermediates to be used in the synthesis of vitamin E (alpha tocopherol). Thus 2,3,5-trimethyl phenol, the substance concerned in the instant specification, is used to produce trimethyl hydroquinone, which is later reacted with phytyl bromide to produce alpha tocopherol, one of the most potent of the known antisterility factors of the vitamin E group.

However, the synthesis of trimethyl hydroquinone has until now involved a series of operations and considerable expenditure of time. In view of certain relatively new methods of manufacture the synthesis may now be greatly simplified if a supply of 2,3,5-trimethyl phenol is available.

The separation of 2,3,5-trimethyl phenol from alkyl phenol mixtures which are obtained by extraction of cracked hydrocarbon distillates would appear quite difficult, due to the fact that not only is it present in such extract in relatively low concentration but also is normally accompanied by an almost equal concentration of 2,4,5-trimethyl phenol which has very nearly the same boiling point and a melting point only slightly lower than that of the 2,3,5-trimethyl phenol. The melting and boiling points of these alkyl phenols are shown in the table below.

|  | Melting point | Boiling point |
| --- | --- | --- |
|  | Degrees | °C. |
| 2,3,5-trimethyl | 95 | 235 |
| 2,4,5-trimethyl | 72 | 232.5 |

Our invention is based on the discovery that a certain narrow fraction of such alkyl phenol mixtures which contains 2,3,5- and 2,4,5-trimethyl phenols in relatively large concentrations will upon crystallization at room temperature yield crystals of 2,3,5-trimethyl phenol, substantially free from 2,4,5-trimethyl phenol. The crystals so recovered may then further be purified by recrystallization from a suitable solvent, particularly isopropyl alcohol.

In carrying out our invention, a narrow fraction of alkyl phenols, having properties as indicated below, is secured by fractionally distilling a suitable alkyl phenol mixture, boiling below and above 235° C. This fraction, normally rich in 2,3,5-trimethyl phenol, is allowed to stand at a temperature not substantially below 0° C. so as to produce crystals. The crystals are then separated and dissolved in a suitable solvent, and the solute is then recrystallized to produce a substantially pure product.

In the preparation of the narrow fraction, we may start with crude or refined alkyl phenols. In general, it is preferable to begin with a desulfurized starting material, though it is not necessary.

The narrow fraction should have the following properties: its A. S. T. M. boiling range between the 5% and 95% points on the distillation curve should not be greater than 20° C. nor less than 4° C., and it is preferable that it have a boiling range of not more than 15° C. and not less than 7° C. Moreover, its 10% A. S. T. M. distillation point should be below 239° C., and its 90% point should be above 234° C. The minimum boiling range of the fraction as set forth enables the recovery of all the 2,3,5-trimethyl phenol, and additionally, it is necessary, because other alkyl phenols should be present to cause a melting point depression of the 2,3,5-trimethyl phenol. On the other hand, if the range is too broad, recovery becomes difficult.

Having secured the desired narrow fraction, we usually introduce it batchwise into an appropriate vessel such as a tank where it is allowed to stand at a temperature preferably between about 5° C. and 25° C. If the temperature is too low, 2,4,5-trimethyl phenol separates, and if too high, a poor yield will result. If desired, it may be seeded to accelerate crystallization. The crystals are then separated from the mother liquor by appropriate means, such as decantation, basket centrifuging or the like.

It will be understood that crystallization may occur at any temperature substantially below the melting point of 2,3,5-trimethyl phenol, and the highest practical temperature of crystallization depends on the concentration of 2,3,5-trimethyl phenol in the narrow fraction. In practice, it will be found that temperatures below about 50°

C. will have to be maintained to obtain substantial crystallization.

The residual mother liquor may be subjected to further crystallization if desired at a somewhat lower temperature not below 0° C. in order to recover additional crystals of 2,3,5-trimethyl phenol which may be separated as described and may be combined with those from the first crystallization. The separated crystals constitute the crude 2,3,5-trimethyl phenol.

The crude crystals are now redissolved in a suitable solvent at an elevated temperature and purified by recrystallization.

A solvent to be suitable should have good solvent power for alkyl phenols, a boiling temperature substantially below that of alkyl phenols, i. e., below 200° C., and must not be too volatile at the temperature of centrifuging, because of the loss of solvent and the danger of explosion. In addition, it is desirable that the temperature coefficient of the solvent power for alkyl phenols be large. Suitable solvents in addition to isopropyl alcohol include alcohols such as methyl alcohol, ethyl alcohol, and n-propyl alcohol; ketones such as methyl ethyl ketone and hexanone; ethers such as di-isopropyl ether; fatty acids, i. e., acetic acid; and aromatic hydrocarbons such as benzene, toluene and xylene. Aliphatic hydrocarbons, while usable, are less desirable, since their temperature coefficients are low.

The amount of the solvent to be used must be such that at the chosen crystallization temperature the solid phase produced on crystallization is not more than 40% and preferably less than 30% by weight of the total mixture, otherwise centrifuging is rendered difficult or impossible.

The temperature of the recrystallization should be low enough to prevent the loss of solvent when the crystals and mother liquor are centrifuged. In general, temperatures between 10° C. and 20° C. are preferred.

After the recrystallization, the crystals so produced are separated from residual solvent, preferably by centrifuging, and the recovered crystals are then dried in any suitable manner as by distilling off occluded solvent, if desired under vacuum.

Residual solvent, after removal of the crystals, is redistilled to separate dissolved alkyl phenols. The distilled solvent may then be re-used for further crystallizations.

If, in the above operations, a substantial portion of alkyl phenols has been retained in the mother liquor or in the alkyl phenols recovered, as may be necessitated by the maximum permissible limit of solids in the crystal slurry, these residual liquids may be redistilled to secure a still narrower heart cut, which is sufficiently rich in 2,3,5-trimethyl phenol to enable recovery of additional crystals. This heart cut may be processed separately in the manner described above, or may simply be combined with a fresh, unprocessed alkyl phenol fraction.

The process is illustrated in the accompanying drawing which represents a simplified flow diagram of a preferred form of our process.

For simplicity, the drawing does not show all pumps, heat exchangers, by-passes, vents, reboilers, and other auxiliaries, the proper placement of which will be evident at once to those skilled in the art.

A suitable 2,3,5-trimethyl phenol fraction is introduced through line 1 into concentrate tank 2, wherein it is allowed to stand or is seeded to produce crystals of crude 2,3,5-trimethyl phenol. The crystals, together with enough of the mother liquor to allow a free flow, are removed from concentrate tank 2 through line 3 to basket centrifuge 4, where the alkyl phenol mother liquor is separated to be discarded through line 5 or returned to concentrate tank 2 through line 26, or conveyed to still 24 through line 25.

Through line 6, the crystals, comparatively free of the mother liquor, are introduced into dissolving tank 7, supplied with steam coil 9, and are dissolved in iso-propyl alcohol from tank 21 introduced through line 8.

The solution of 2,3,5-trimethyl phenol in isopropyl alcohol is withdrawn from dissolving tank 7 through line 10, passes through an interposed clarification filter 11, and thence through line 12 to crystillization tank 13, cooled by an outside water cooling jacket, wherein comparatively pure 2,3,5-trimethyl phenol is crystallized.

The crystals together with the mother liquor are withdrawn through line 14 and conveyed to a second basket centrifuge 15, where the isopropyl alcohol mother liquor is separated and removed through line 16. The 2,3,5-trimethyl phenol crystalline product is removed through line 17 to product drying tray 18 in drying oven 28 where it is dried by the evaporation of any remaining alcohol.

Through line 16 leaving basket centrifuge 15, the isopropyl alcohol mother liquor passes to still 19, where alkyl phenols and isopropyl alcohol are separated by distillation. The isopropyl alcohol is taken overhead through line 20, is condensed, and passes through line 22 to isopropyl alcohol storage tank 21. The alkyl phenols leave still 19 through line 23 and may be discarded through line 30 or be conveyed through line 29 to still 24.

In still 24 alkyl phenol mother liquor from basket centrifuge 4 or alkyl phenols from the bottom of still 19 or both are distilled to remove a heart cut which is withdrawn through line 27 and is returned to concentrate tank 2.

The following examples will serve to illustrate our process.

*Example I.*—Alkyl phenols boiling between 225° C. and 245° C. were distilled in the laboratory into numerous fractions, among which was a fraction boiling at about 236° C. On standing for some time, a considerable growth of crystals appeared in this and neighboring fractions. The crystals were separated from their mother liquor by filtration, and were then subjected to six recrystallizations from ethyl alcohol. The substance thus isolated was found upon analysis to be 2,3,5-trimethyl phenol.

*Example II.*—3,150 gallons of an alkyl phenol mixture (5% distillation point 220° C. 95% distillation point 240° C.) was fractionally distilled in a commercial still into many narrow fractions having boiling ranges between the 5% and 95% A. S. T. M. distillation points averaging 5.6° C. Fourteen consecutively filled drums of the product were selected, such that the seventh drum had a 50% distillation point of 234° C. The contents of these drums were removed to a pilot plant, where they were redistilled to recover thirteen drums of overhead product which was allowed to stand for several weeks during cool weather (50°–70° F.) to result in crystallization of 2,3,5-trimethyl phenol. Crystals developed in all but the first two and the last drum of the distilled product, and were present in greatest concentration in the seventh drum. The crystals were separated from the mother liquor in a basket centrifuge and twice recrystallized from isopropyl alcohol. The yield of final product, consisting of substantially pure 2,3,5-trimethyl phenol, was 1.76 by weight of the original alkyl phenols charged to the commercial still.

We claim as our invention:

1. The process of separating and recovering 2,3,5-trimethyl phenol from alkyl phenol mixtures containing it which comprises fractionally distilling said mixture to produce a narrow fraction having the following A. S. T. M. distillation properties: a boiling range between the 5% and 95% points of the distillation curve is not greater than 20° C. and not less than 4° C., the 10% point is below 239° C. and the 90% point is above 234° C.; causing said fraction to crystallize at a temperature not substantially below 0° C., separating the resulting crystals from their mother liquor, and then recrystallizing them from a low molecular weight alcohol for alkyl phenols having a boiling temperature below 200° C.

2. The process of claim 1 wherein the solvent is isopropyl alcohol.

DANIEL B. LUTEN, Jr.
SAMUEL BENSON THOMAS.